Nov. 29, 1955
P. M. WEYRICK
2,725,456
HEATING APPARATUS
Filed Aug. 18, 1953
3 Sheets-Sheet 1
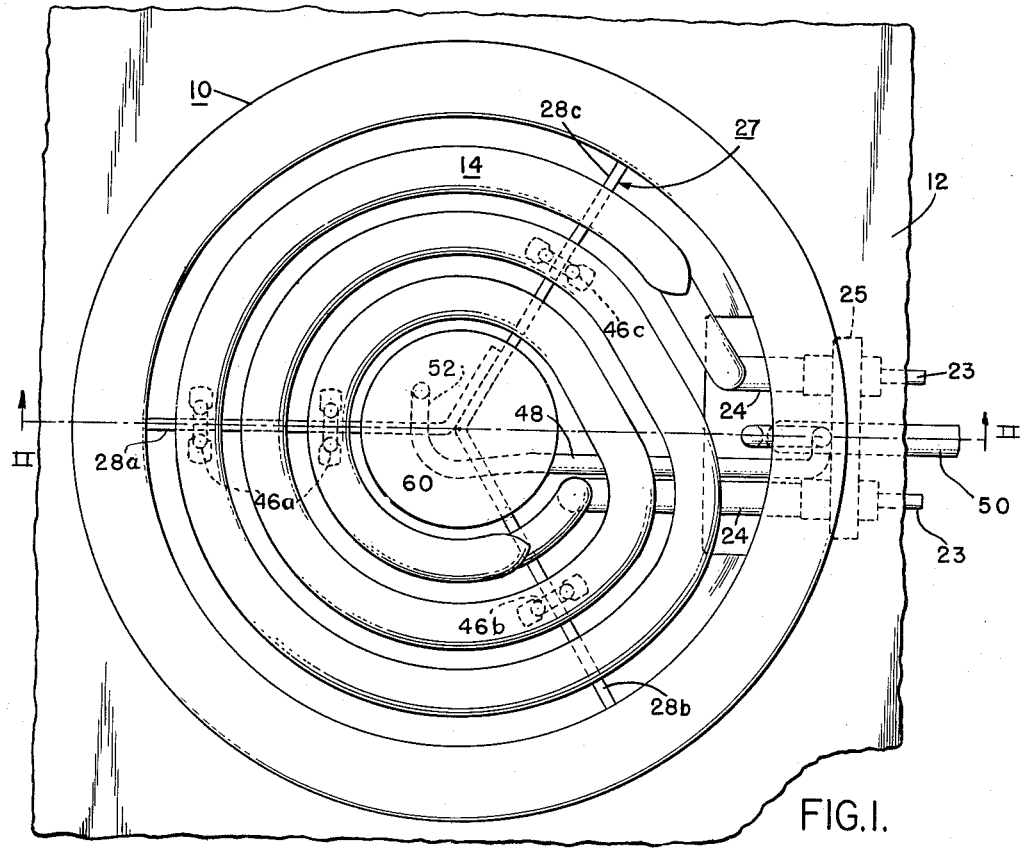
FIG.I.
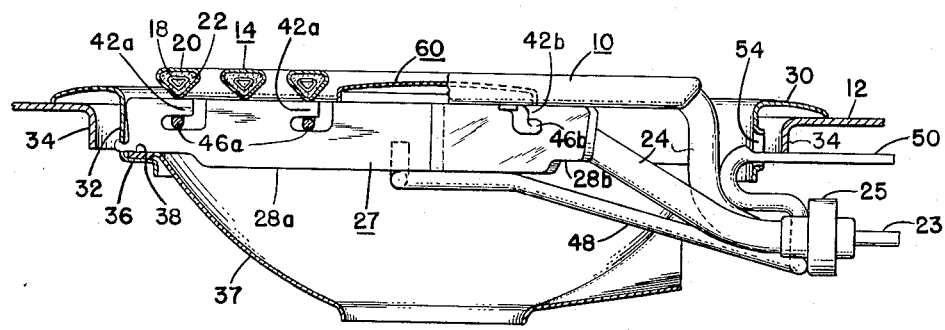
FIG.2.
INVENTOR
PAUL M. WEYRICK
BY
ATTORNEY Nov. 29, 1955  P. M. WEYRICK  2,725,456
HEATING APPARATUS
Filed Aug. 18, 1953  3 Sheets-Sheet 2

INVENTOR
PAUL M. WEYRICK
BY
ATTORNEY

Nov. 29, 1955 P. M. WEYRICK 2,725,456

HEATING APPARATUS

Filed Aug. 18, 1953 3 Sheets-Sheet 3

INVENTOR
PAUL M. WEYRICK

BY

ATTORNEY

United States Patent Office 2,725,456
Patented Nov. 29, 1955

2,725,456

HEATING APPARATUS

Paul M. Weyrick, Ashland, Ohio, assignor to Westinghouse Electric Corporation, East Pittsburgh, Pa., a corporation of Pennsylvania Application August 18, 1953, Serial No. 374,972

3 Claims. (Cl. 219—37)

This invention relates to electric cooking units, more particularly to surface cooking units of the sheathed heater type.

It is an object of the invention to provide an electric surface cooking unit of the sheathed heater type which may be more easily and quickly assembled at the factory, thereby reducing the cost thereof.

Electric surface cooking units of the sheathed type are generally supported from below by a spider framework having a plurality of legs joined at the center and radiating outwardly therefrom. Heretofore, it has been the practice to join the legs of the spider to each other to form a unitary framework which was then attached to the heater in a subsequent and separate assembly step. In one present construction, the unitary spider framework is attached to the heater in a manner to permit a limited degree of relative sliding movement upon expansion of the heater when heated.

In accordance with my invention, the cooking unit is formed in a manner to permit the legs of the spider to be joined to each other and to the heater at the same time, thereby facilitating the assembly procedure, reducing the assembly time heretofore required, and accordingly reducing the cost of manufacture of the cooking unit. The spider legs and the heater are provided with cooperating means which restrain the heater against vertical movement but permit the heater to slide horizontally, thereby minimizing the tendency of the heater to warp upon expansion incidental to heating.

The above and other objects are effected by the invention as will be apparent from the following description taken in connection with the accompanying drawings, forming a part of this application, in which:

Fig. 1 is a plan showing an electric surface cooking unit supported in a platform and embodying my invention;

Fig. 2 is a central vertical section, with some parts shown in elevation, taken on line II—II of Fig. 1;

Figure 3:
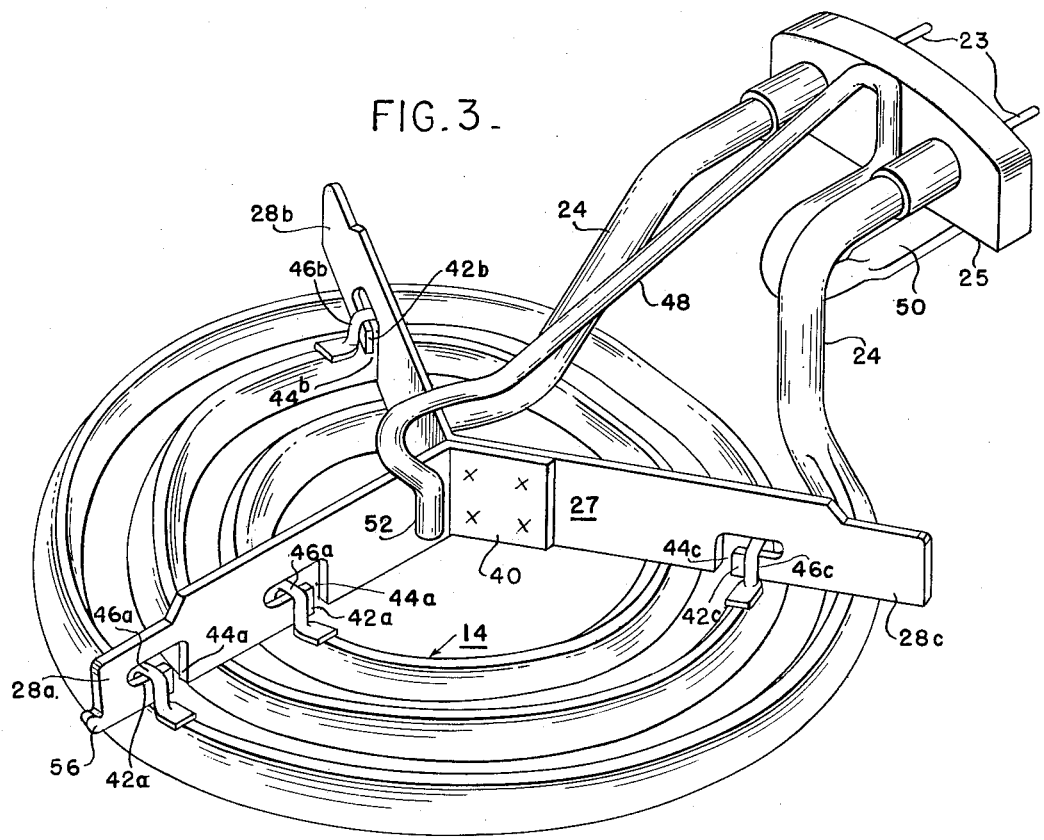
Fig. 3 is a perspective view of the finished heating unit in inverted position.

Referring to the drawings in detail, especially Figs. 1 and 2, there is shown an electric surface cooking unit, generally designated 10, supported in a range platform 12. The surface cooking unit 10 has a sheathed heater 14 wound into a generally flat spiral shape to provide a horizontal cooking surface disposed above the surface of the platform.

The sheathed heater 14 may be of any desired type having an electrical heating element 18 disposed within an outer metallic sheath 20 and spaced therefrom by a mass of highly compacted refractory powder 22, such as magnesium oxide. The sheathed heater 14 has its terminal portions 24 extended downwardly and outwardly, as seen in Fig. 2, for electrical connection purposes. Terminal pins 23, electrically connected to the heating element 18, extend outwardly from the terminal portions of the sheathed heater for connecting the heating element to a power supply (not shown). The terminal portions 24 may be mechanically connected to each other by a member 25 disposed adjacent the terminal pins 23. The member 25 further serves as a drip shield to prevent spillage from flowing to the terminal pins 23.

The sheathed heater 14 is supported from below by a spider framework, generally designated 27, having a plurality of radially disposed legs 28a, 28b and 28c. The spider 27 is supported on an annular ornamental bezel 30, which has a vertical wall portion 32 disposed in an opening 34 provided in the platform 12 and is further provided with an inwardly extending horizontal flange 36 which serves to support a reflector pan 37 and the spider 27 (see Fig. 2). The reflector pan 37 is provided with a peripheral flange 38 which rests upon the flange 36 of the bezel and the legs 28a, 28b and 28c of the spider 27 rest upon the flange 38. The reflector pan 37 is not shown in Fig. 1 for the sake of clearness.

As best shown in Fig. 3, the spider legs 28b and 28c are preferably integrally joined to each other and are disposed at an angle of approximately 120 degrees to each other, thereby forming a V. The spider leg 28a has a flanged inner end portion 40, also bent at an angle of approximately 120 degrees to the leg 28a. A plurality of tongues 42a are provided in the spider leg 28a. The spider legs 28b and 28c are provided with tongues 42b and 42c, respectively. Each of the tongues extends inwardly, that is, toward the inner ends of the spider legs. These tongues are integral with the spider legs and are formed therein by a stamping operation or the like. Adjacent the inner ends of the tongues there are provided passages 44a, 44b and 44c, respectively.

The sheathed heater 14 is provided with a plurality of U-shaped members or stirrups 46a, 46b and 46c attached to its underside by means of spot welding or the like. It will be noted that the stirrups are arranged on the sheathed heater in such a manner that they engage the appropriate tongues formed in the spider legs, thereby locking the sheathed heater 14 to the spider 27, when the spider leg 28a is attached to the spider legs 28b and 28c at its flange 40.

Figure 4:
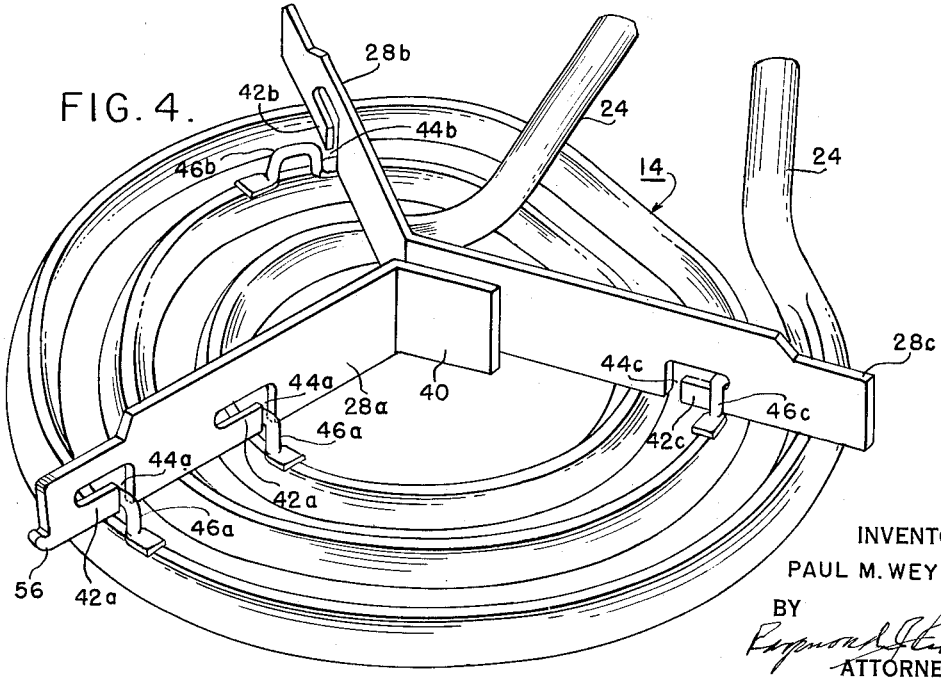
Fig. 4 is a fragmentary perspective view similar to Fig. 3 but showing the heating unit in a stage of assembly.
Figure 5:
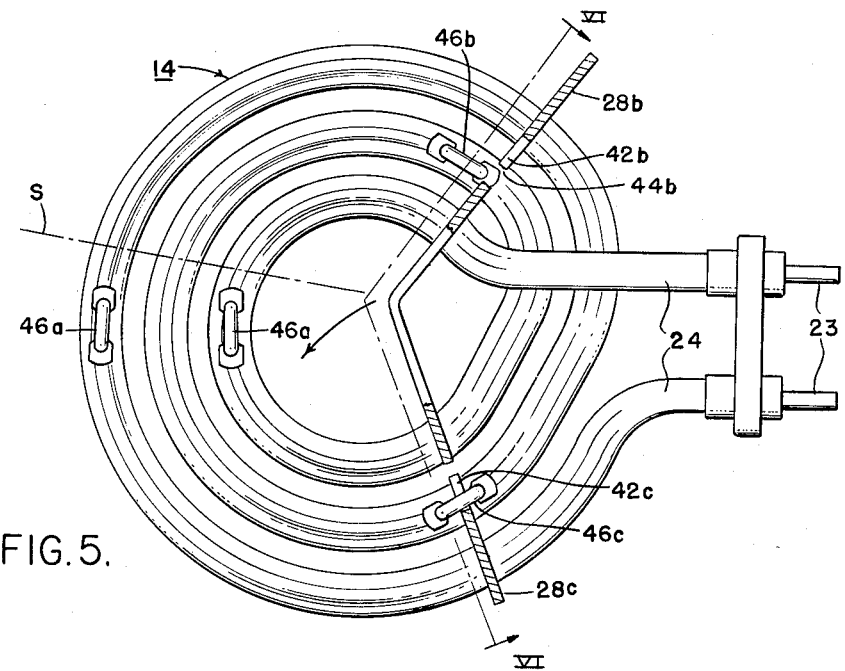
Fig. 5 is a bottom view showing the heating unit in the same stage of assembly as Fig. 4.
Figure 6:
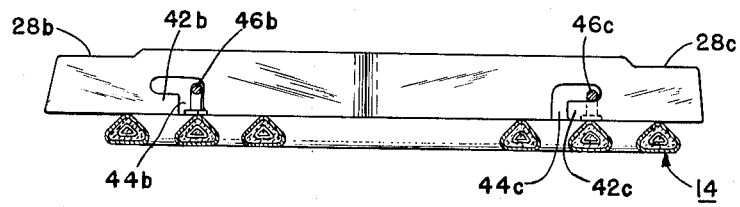
Fig. 6 is a sectional view taken on line VI—VI of Fig. 5.

To assemble the sheathed heater 14 to the spider 27, the sheathed heater is placed in inverted position, as shown in Figs. 4, 5 and 6, and the spider member comprising legs 28b and 28c is assembled first. The tongue 42c is inserted through the stirrup 46c, such insertion being permitted by the passage 44c. The spider member is then lowered into contact with the surface of the sheath and swung around about stirrup 46c until its passage 44b lies in horizontal alignment with the stirrup 46b. The stirrup 46b at this time lies to the left of the tongue 42b. The spider member is then rotated counterclockwise about stirrup 46c as a center until the tongue 42b is in registry with stirrup 46b, whereupon the spider member may be moved downwardly as viewed in Fig. 5, to effect insertion of the tongue 42b in the stirrup 46b. The leg 28a may then be assembled by placing it in such a position that the passages 44a receive the stirrups 46a. The leg 28a is then lowered further until it contacts the surface of the sheath, whereupon the leg may be moved radially inwardly to effect insertion of the tongues 42a in the corresponding stirrups 46a. The legs 28a, 28b and 28c are positioned so that the various stirrups engage mid portions of their respective tongues and the leg 28a is then rigidly fastened to the leg 28c at the flange 40, as by spot welding indicated in Fig. 3 by the symbols x.

When the spider leg 28a is attached, the heater is permanently locked to the spider and cannot be disengaged therefrom, even though the parts are moved manually relative to each other. As best illustrated in Fig. 5, the spider member comprising legs 28b and 28c is shown at the exact position of disengagement from stirrup 46b. The dot-dash line S represents the position which the spider leg 28a (after assembly) would have to assume to permit movement of the spider to the above position. However, the spider leg 28a is restrained against the required rotational movement by the tongues and stirrups 42a and 46a, respectively.

The cooperating stirrups on the heater and the tongues on the spider restrain the heater from warping upwardly upon being heated, but permit the heater to slide horizontally a limited amount upon the spider. The horizontal movement of the heater may best be described as an outward radial movement of the sheath with respect to the center of the spider. Hence, as apparent from consideration of Fig. 2, the stirrups move toward the closed ends of the slots upon such movement, eliminating the possibility of disengagement of the heater and the spider when heated.

After the above assembly is completed, a deviously shaped rod member 48, having a flattened outer end portion 50 and an inner bent portion 52, may be attached at its inner end 52 to the spider leg 28a and adjacent its outer end to the drip shield 25, by means of spot welding or the like. Referring to Fig. 2, it will be seen that the rod end portion 50 serves to lock the surface unit 10 to the platform 12, the bezel having an opening 54 through which the member 50 extends into engagement with the depending flange 34 of the range platform. If desired, the leg 28a may be provided with a small finger 56 at its outer end portion, which finger is received in an opening provided in the bezel 30 to lock the heating unit in operative position.

After the heater 14 is attached to the spider framework 27, an inverted cup-shaped escutcheon plate 60 may be attached to the spider in a central position, as shown in Figs. 1 and 2.

It will now be seen that I have provided a surface cooking unit of the sheathed heater type which may be easily assembled at the factory with a minimum of operations. Also, the spider is positively locked to the sheathed heater and cannot become disengaged therefrom, since all of the tongues are directed radially inwardly, that is, toward the center of the heating unit.

Although I have shown the spider as having two tongues on leg 28a and one tongue on each of legs 28b and 28c, it will be understood that the number of tongues provided on the legs is not critical and may be varied as desired. Also, although I have shown the spider framework as having three legs, it is entirely within the scope of the invention to provide more legs than shown and to vary the angular spacing therebetween, as desired.

While the invention has been shown in but one form, it will be obvious to those skilled in the art that it is not so limited, but is susceptible of various changes and modifications without departing from the spirit thereof.

What is claimed is:

1. An electric surface heating unit comprising a sheathed heater bent to form a horizontal cooking surface, a spider disposed below said heater and in abutment therewith for supporting the same, said spider having a plurality of legs, each of said legs having an inner end portion and an outer end portion, said legs being disposed adjacent each other at their inner end portions and extending outwardly therefrom in different directions, whereby said inner end portions are disposed adjacent the center of said cooking surface and said outer end portions are spaced from each other along the periphery of said cooking surface, and means for locking said heater to said spider comprising cooperating interlocking portions provided on the underside of said heater and the upper side of at least two of said legs, said portions being separable by movement of said legs in radially outward direction and being engageable by movement of said legs in radially inward direction, said legs being joined to each other adjacent their inner end portions to prevent such detachment.

2. An electrical surface heating unit comprising a sheathed heater bent to a spiral shape to provide a flat horizontal cooking surface of generally circular periphery, a spider disposed below said heater and supporting the same, said spider having three elongated legs provided with inner end portions and outer end portions, two of said legs being integral with each other at said inner end portions and being disposed at an angle to each other of about 120° thereby forming a V, means for joining the inner end of the third leg to the inner end portion of one of the other legs, said means comprising a flange disposed at the inner end portion of the third leg at an angle of about 120° therewith, and means for locking said heater to said spider comprising a horizontally disposed tongue provided on each of said legs and extending toward the inner portions of the latter and a plurality of stirrup-like members attached to the underside of said heater, each of said tongues engaging one of said stirrup-like members, said inter-engaging tongues and stirrup-like members being positioned to permit disengagement therebetween and detachment of said legs from said heater by relative movement between said third leg and said two legs, said locking means preventing detachment of said legs from said heater when said third leg is joined to said two integral legs, said locking means permitting sliding movement of said heater relative said legs as said heater expands and contracts due to changes in temperature.

3. An electrical surface heating unit comprising a sheathed heater bent to form a horizontal heating surface, a plurality of supporting legs extending generally parallel to said heating surface and adjacent the under side of said heater, a plurality of pairs of inter-engaging tongue and stirrup members for attaching said legs to said heater, one member of each pair being attached to said under side of said heater and the other member of each pair being attached to the upper side of said legs, said one member being positioned to cooperate with said other member to permit disengagement therebetween and detachment of said legs from said heater by relative movement of at least two of said legs, said inter-engaging members being interlocked to prevent detachment of said legs from said heater when said legs are joined to each other, said inter-engaging members permitting sliding movement of said heater relative said legs as said heater expands and contracts due to changes in temperature.

References Cited in the file of this patent
UNITED STATES PATENTS

| | | |
|---|---|---|
| 2,550,843 | McOrlly | May 1, 1951 |
| 2,654,825 | Cunningham | Oct. 6, 1953 |